United States Patent
Lang et al.

(10) Patent No.: US 9,267,694 B2
(45) Date of Patent: Feb. 23, 2016

(54) METHOD AND SYSTEM FOR CONTROLLING THE TEMPERATURE OF COMPONENTS

(71) Applicant: OBLAMATIK AG, Chur (CH)

(72) Inventors: Edo Lang, Chur (CH); Roland Obrist, Scharans (CH)

(73) Assignee: OBLAMATIK AG, Chur (CH)

(*) Notice: Subject to any disclaimer, the term of this patent is extended or adjusted under 35 U.S.C. 154(b) by 472 days.

(21) Appl. No.: 13/777,600

(22) Filed: Feb. 26, 2013

(65) Prior Publication Data

US 2013/0220590 A1 Aug. 29, 2013

(30) Foreign Application Priority Data

Feb. 29, 2012 (CH) ........................................ 266/12

(51) Int. Cl.

| | |
|---|---|
| *G06G 7/66* | (2006.01) |
| *F24D 19/10* | (2006.01) |
| *F24F 11/02* | (2006.01) |
| *F24F 5/00* | (2006.01) |
| *F24F 3/06* | (2006.01) |
| *G05D 23/19* | (2006.01) |
| *F24D 3/14* | (2006.01) |
| *F24D 3/12* | (2006.01) |
| *F24F 11/00* | (2006.01) |

(52) U.S. Cl.
CPC .............. *F24D 19/1015* (2013.01); *F24F 3/06* (2013.01); *F24F 5/0092* (2013.01); *F24F 11/022* (2013.01); *G05D 23/1927* (2013.01); *F24D 3/12* (2013.01); *F24D 3/14* (2013.01); *F24F 2011/0082* (2013.01)

(58) Field of Classification Search
CPC ......... F24D 19/1015; F24D 3/14; F24D 3/12; F24F 3/06; Y10T 137/87676; Y10T 137/87692; Y10T 137/0318
See application file for complete search history.

(56) References Cited

U.S. PATENT DOCUMENTS

| | | | | |
|---|---|---|---|---|
| 3,484,805 | A | * | 12/1969 | Lorenz ............................ 62/139 |
| 4,363,441 | A | * | 12/1982 | Feinberg ......................... 236/36 |
| 4,449,569 | A | * | 5/1984 | Lisi et al. ....................... 165/293 |
| 4,574,870 | A | * | 3/1986 | Weitman ........................ 165/292 |
| 4,699,676 | A | * | 10/1987 | Held ................................ 156/64 |
| 4,706,467 | A | * | 11/1987 | Thorsen et al. .................. 62/139 |

(Continued)

FOREIGN PATENT DOCUMENTS

| | | |
|---|---|---|
| DE | 4417941 | 11/1995 |
| EP | 0 189 614 | 8/1986 |

(Continued)

*Primary Examiner* — Darrin Dunn
(74) *Attorney, Agent, or Firm* — Notaro, Michalos & Zaccaria P.C.

(57) ABSTRACT

Temperature-control system used for heating or cooling in a method for controlling temperature of a component includes connected temperature-control device, temperature-control arrangement, supply line, and return line. The system additionally has a controller having a valve, an actuator, a supply temperature sensor, and a return temperature sensor. A temperature difference between the supply temperature and the return temperature of a fluid circulating in the system is registered using the supply temperature sensor and the return temperature sensor and also a regulator. Proceeding from this temperature difference, the regulator causes the actuator to set a degree of opening of the valve so the temperature difference is in a selected value range. The valve always has a minimal degree of opening in the open state.

4 Claims, 4 Drawing Sheets

(56) References Cited

U.S. PATENT DOCUMENTS

| | | | |
|---|---|---|---|
| 4,745,767 A * | 5/1988 | Ohya et al. | 62/211 |
| 5,144,811 A * | 9/1992 | Brodie et al. | 62/176.6 |
| 5,150,102 A * | 9/1992 | Takashima | 340/584 |
| 5,244,148 A * | 9/1993 | Vandermeyder | 236/46 R |
| 5,435,379 A * | 7/1995 | Moslehi et al. | 165/80.4 |
| 5,643,482 A * | 7/1997 | Sandelman et al. | 219/497 |
| 5,839,655 A * | 11/1998 | Iritani | 237/8 A |
| 7,454,308 B1 * | 11/2008 | Carroll | 702/130 |
| 7,586,741 B2 * | 9/2009 | Matsushima et al. | 361/679.47 |
| 8,583,290 B2 * | 11/2013 | Campbell et al. | 700/282 |
| 2003/0016498 A1 * | 1/2003 | Kurokawa et al. | 361/699 |
| 2003/0205371 A1 * | 11/2003 | Lines et al. | 165/299 |
| 2006/0037331 A1 * | 2/2006 | Nicolai et al. | 62/129 |
| 2006/0249211 A1 * | 11/2006 | Tooke et al. | 137/883 |
| 2007/0018007 A1 * | 1/2007 | Neill | 236/93 R |
| 2008/0088867 A1 * | 4/2008 | Ikeda et al. | 358/1.13 |
| 2008/0295785 A1 * | 12/2008 | Harris et al. | 123/41.08 |
| 2009/0118871 A1 * | 5/2009 | Debourke et al. | 700/282 |
| 2009/0200000 A1 * | 8/2009 | Kammerzell | 165/110 |
| 2009/0222145 A1 * | 9/2009 | Larsen et al. | 700/299 |
| 2009/0241578 A1 * | 10/2009 | Carlson et al. | 62/259.2 |
| 2010/0100090 A1 * | 4/2010 | Rose | 606/22 |
| 2010/0186941 A1 * | 7/2010 | Ichinose et al. | 165/247 |
| 2010/0241278 A1 * | 9/2010 | Brunschwiler et al. | 700/282 |
| 2010/0305775 A1 * | 12/2010 | Bean et al. | 700/300 |
| 2010/0319783 A1 * | 12/2010 | Kim | 137/10 |
| 2011/0054703 A1 * | 3/2011 | Heavner, III | 700/282 |
| 2011/0100618 A1 * | 5/2011 | Carlson | 165/287 |
| 2011/0112693 A1 * | 5/2011 | Ye et al. | 700/277 |
| 2011/0277983 A1 * | 11/2011 | Takahashi | 165/300 |
| 2012/0006527 A1 * | 1/2012 | Huang et al. | 165/295 |
| 2012/0041608 A1 * | 2/2012 | Zugibe et al. | 700/285 |
| 2012/0073670 A1 * | 3/2012 | Lymberopoulos | 137/2 |
| 2012/0097361 A1 * | 4/2012 | Yang | 165/45 |
| 2012/0103591 A1 * | 5/2012 | Tozer | 165/281 |
| 2012/0138259 A1 * | 6/2012 | Carlson | 165/11.1 |
| 2012/0183014 A1 * | 7/2012 | Larsen et al. | 374/141 |
| 2012/0197446 A1 * | 8/2012 | Glaudel | 700/282 |
| 2012/0260678 A1 * | 10/2012 | Yoshida | 62/56 |
| 2012/0298332 A1 * | 11/2012 | Petters et al. | 165/104.11 |
| 2012/0330468 A1 * | 12/2012 | Lopez Rodriguez | 700/285 |
| 2013/0037254 A1 * | 2/2013 | Carlson et al. | 165/287 |
| 2013/0161009 A1 * | 6/2013 | Price et al. | 166/303 |
| 2013/0205822 A1 * | 8/2013 | Heiland et al. | 62/259.2 |
| 2014/0007613 A1 * | 1/2014 | Uchida et al. | 62/509 |
| 2014/0083673 A1 * | 3/2014 | Thuillard et al. | 165/299 |
| 2015/0148971 A1 * | 5/2015 | Acker | 700/282 |

FOREIGN PATENT DOCUMENTS

| | | |
|---|---|---|
| EP | 0 816 766 | 1/1998 |
| EP | 1 564 616 | 8/2005 |
| GB | 2 034 111 | 5/1980 |
| GB | 2 062 216 | 10/1982 |
| WO | WO 2007/090405 | 8/2007 |

* cited by examiner

METHOD AND SYSTEM FOR CONTROLLING THE TEMPERATURE OF COMPONENTS

RELATED PATENT APPLICATIONS

This patent application claims priority of the Swiss Patent Application No. CH 00266/12 of Feb. 29, 2012, the entire disclosure of which is herein incorporated by explicit reference for any purpose.

RELATED FIELD OF TECHNOLOGY

The invention relates to a temperature-control method for temperature control, i.e., for heating or cooling a component. Such components are, for example, a floor, a wall, or a ceiling of a living or working space; they can also be freestanding heating or cooling walls, however. A temperature-control system capable of carrying out this temperature-control method typically comprises a temperature-control device, a temperature-control arrangement, a supply line, and a return line, which are all connected to one another. This temperature-control system additionally comprises a control and regulating unit having an actuator, a supply temperature sensor, and a return temperature sensor.

RELATED PRIOR ART

In the temperature-control systems known from the prior art, the flow rate of the temperature-control fluid is typically set statically by means of mechanical flow rate actuators. The thermal actuators are designed as a two-point regulation and the energy to be delivered of a temperature-control system designed as a heating system, for example, is substantially set by a complex hydraulic equalization of the TOP meters. These TOP meters are actuators which statically set the flow rate of the temperature-control fluid in the heating circuit consisting of supply, floor heater (=temperature-control arrangement), and return. However, the installer requires characteristic variables to set the flow rate to be achieved. The characteristic variables are influenced by the pipe diameter (mud blockage) and the flow pressure (e.g., by opening and closing multiple parallel strands) of the temperature-control fluid. The supply and return temperatures resulting therefrom are further influenced by the supply temperature and the temperature of the temperature-control arrangement. In spite of experience and the application of the greatest care, only imprecise setting of the individual strands or heating circuits is therefore possible, however. Uneven heat distribution, on the one hand, or insufficient energy efficiency, on the other hand, results therefrom. Furthermore, in the case of renovations, the theoretically ascertained manipulated variables are not available and can only be ascertained with great effort. A further problem is represented by inaccurate room thermostats, which often exert a simple on/off function on such a floor heater.

Although there are approaches for more precisely ascertaining the energy consumption of heating systems (cf., e.g., DE 44 17 941 A1), up to this point concepts which could successfully remedy the substantial disadvantages of the above-described prior art have been lacking.

OBJECT AND SUMMARY OF THE INVENTION

It is therefore the object of the present invention to propose a temperature-control method and a temperature-control system, which is capable of carrying out this method, for heating or cooling a component, which eliminate or at least minimize the substantial disadvantages known from the prior art. It is preferable in particular for this temperature-control method to allow significantly more uniform energy delivery to components or significantly more uniform energy absorption from components and therefore to increase the comfort and the energy efficiency.

For the purpose of better comprehensibility, heating methods or heating systems are predominantly referred to hereafter in conjunction with temperature-control methods or temperature-control systems; however, these embodiments also apply accordingly for cooling methods or cooling systems.

According to a first aspect, this object is achieved by a simpler temperature-control method, as herein disclosed and claimed. This method according to the invention for the temperature control of a component is carried out using a simpler temperature-control system, which comprises:
  a) a temperature-control device which is implemented for heating or cooling a temperature-control fluid;
  b) a temperature-control arrangement which is implemented for conducting the temperature-control fluid through a component to be controlled in temperature;
  c) a supply line, via which the temperature-control device is connected to the temperature-control arrangement to supply the temperature-control fluid;
  d) a return line, via which the temperature-control arrangement is connected to the temperature-control device to return the temperature-control fluid; and
  e) a controller, which comprises a valve having an actuator, which is implemented to set a degree of opening of the valve inserted in the supply line or the return line, and also a supply temperature sensor and a return temperature sensor; wherein the controller is implemented to activate the actuator.

In the proposed method, a supply temperature of the temperature-control fluid is registered using the supply temperature sensor and a return temperature of the temperature-control fluid is registered using the return temperature sensor.

According to the invention, a temperature difference between the supply temperature and the return temperature of the temperature-control fluid is registered using a regulator of the controller, wherein the regulator, proceeding from this temperature difference, causes the actuator of the valve to set the degree of opening of the valve in such a manner that the mean temperature difference between the supply temperature and the return temperature of the temperature-control fluid is in a predetermined value range.

Alternatively or additionally, a more complex temperature-control method having the features as herein disclosed and claimed can also be applied. This method according to the invention for controlling the temperature of a component is carried out using a more complex temperature-control system, which comprises:
  2 to n temperature-control arrangements for conducting the temperature-control fluid through the component to be controlled in temperature, wherein the 2 to n temperature-control arrangements are connected via a common supply line to the temperature-control device;
  2 to n return lines for returning the temperature-control fluid from the 2 to n temperature-control arrangements to the temperature-control device;
  2 to n return temperature sensors, wherein each return temperature sensor is arranged on or in one of the return lines and the supply temperature sensor is arranged on or in the common supply line;
  2 to n valves, which are each equipped with an actuator and each of which is inserted into a separate supply line after a supply manifold or each of which is inserted into one of the return lines, preferably before an optional return manifold, wherein the actuators are implemented to set a degree of opening of the respective valve, and wherein the controller is implemented to activate the actuators.

The regulator registers the respective temperature differences between the common supply temperature registered by the supply temperature sensor and the 2 to n individual return temperatures of the temperature-control fluid, which are registered by the return temperature sensors. An individual temperature difference between the supply temperature and each one of the 2 to n return temperatures of the temperature-control fluid is registered using the regulator of the controller in each case. Proceeding from these individual temperature differences, the regulator causes the actuators of the 2 to n valves to set the degree of opening of these valves in such a manner that the individual mean temperature differences between the supply temperature and the respective return temperature of the temperature-control fluid are each in a predetermined value range.

According to a second aspect, this object is achieved with a simpler temperature-control system, which has the features as herein disclosed and claimed. This temperature-control system, which is capable of carrying out the temperature-control method according to the invention, comprises at least:
a) one temperature-control device which is implemented for heating or cooling a temperature-control fluid;
b) one temperature-control arrangement which is implemented for conducting the temperature-control fluid through a component to be controlled in temperature;
c) one supply line, via which the temperature-control device is connected to the temperature-control arrangement to supply the temperature-control fluid;
d) one return line, via which the temperature-control arrangement is connected to the temperature-control device to return the temperature-control fluid; and
e) one controller, which comprises a valve having an actuator which is implemented to set a degree of opening of the valve inserted into the supply line or return line, and also a supply temperature sensor and a return temperature sensor. The controller is implemented to activate the actuator, the supply temperature sensor is implemented to register the supply temperature of the temperature-control fluid, and the return temperature sensor is implemented to register a return temperature of the temperature-control fluid.

According to the invention, the controller comprises a regulator, which is implemented to register a temperature difference between the supply temperature and the return temperature of the temperature-control fluid. The regulator is implemented such that, proceeding from this temperature difference, it causes the actuator of the valve to set the degree of opening of the valve in such a manner that the mean temperature difference between the supply temperature and the return temperature of the temperature-control fluid is in a predetermined value range.

Alternatively or additionally, a more complex temperature-control system having the features as herein disclosed and claimed can also be used. This temperature-control system, which is capable of carrying out the temperature-control method according to the invention, comprises:
2 to n temperature-control arrangements for conducting the temperature-control fluid through the component to be controlled in temperature, wherein the 2 to n temperature-control arrangements are connected via a common supply line to the temperature-control device;
2 to n return lines for returning the temperature-control fluid from the 2 to n temperature-control arrangement to the temperature-control device;
2 to n return temperature sensors, wherein each return temperature sensor is arranged on or in one of the return lines and the supply temperature sensor is arranged on or in the common supply line;
2 to n valves, which are each inserted with an actuator in a separate supply line after a supply manifold or in one of the return lines, preferably before an optional return manifold, wherein the actuators are implemented to set a degree of opening of the respective valve, and wherein the controller is implemented to activate the actuators.

Further preferred refinements and features according to the invention are herein disclosed and claimed.

Advantages of the temperature-control method according to the invention or the temperature-control system according to the invention comprise the following:
The energy delivery is essentially determined by the actual difference between the supply temperature and the return temperature, the temperature-control system is therefore substantially independent of the supply temperature, but rapid heating is nonetheless made possible;
Because the regulation is actively performed, the supply temperature can be kept low and therefore the heating costs can be minimized;
The influence of interfering variables (heating sources such as open fires or cooling sources such as open windows) can be minimized: Opening a window does not generate an additional heating requirement, for example, sunny weather even reduces the heating requirement; for example, separate window switches are not required in hotels;
Through the achievable uniform heat distribution, the consumer consistently enjoys higher comfort (even in the event of partial mud blockage);
The use of TOP meters and therefore iterated hydraulic equalization on location can be omitted, in addition, the number of moving parts of the temperature-control system is reduced to a minimum, both of these measures increase the reliability of these systems and setting-calculation expenditure no longer results for the designers and installers;
The temperature-control system is flexible and can be expanded practically as desired, it also functions without floor temperature sensors, because the supply temperature and the return temperature are measured.

BRIEF INTRODUCTION OF THE ATTACHED DRAWINGS

The temperature-control method according to the invention and the temperature-control system according to the invention will now be explained in greater detail on the basis of schematic drawings and preferred embodiments, which are not to limit the scope of the invention, and on the basis of measurement results. In the figures:
FIG. 1 shows a schematic top view of a simpler temperature-control system according to a first embodiment;
FIG. 2 shows a schematic partial top view of the controller of a simpler temperature-control system according to a second embodiment;
FIG. 3 shows a schematic top view of a more complex temperature-control system;
FIG. 4 shows a selection of actuator/regulator combinations, wherein:

DETAILED DESCRIPTION OF THE PRESENT INVENTION

Figure 1:
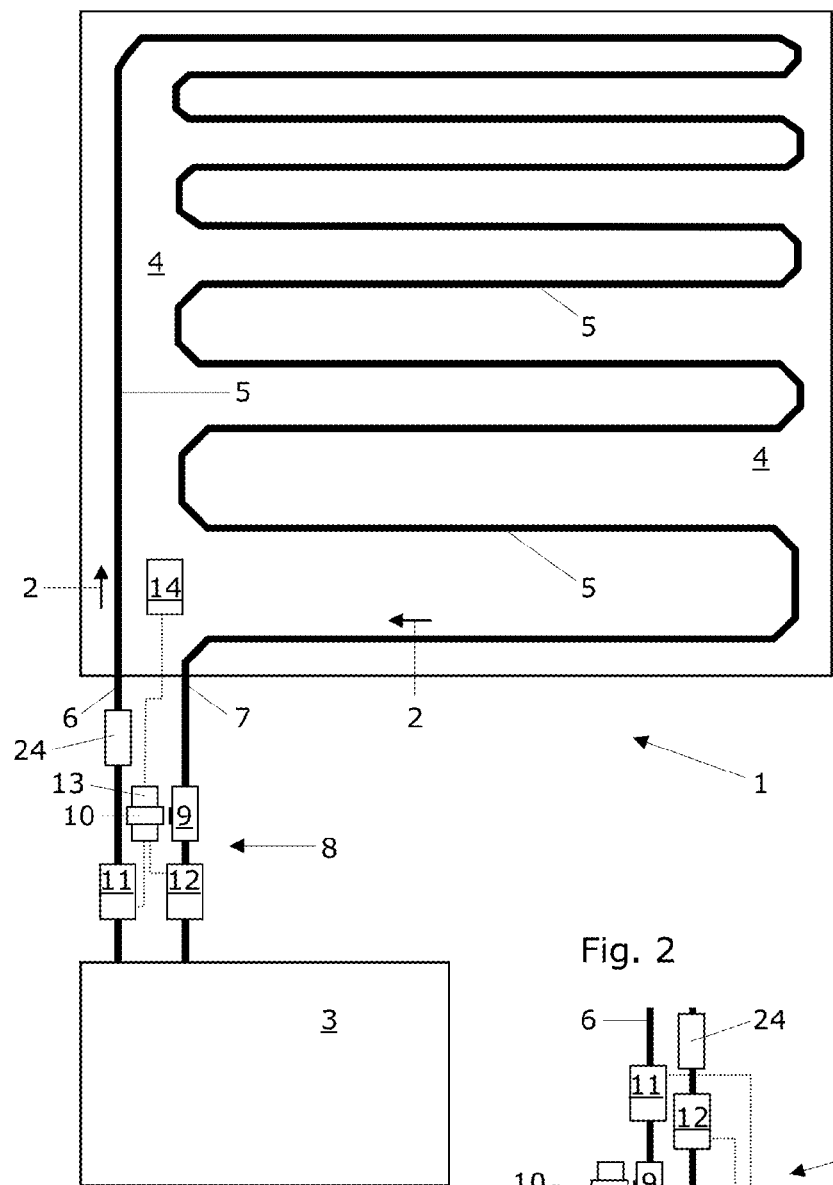

FIG. 1 shows a schematic top view of a simpler temperature-control system according to a first embodiment. This temperature-control system is capable of carrying out the method according to the invention for the controlling the temperature of a component. This simpler temperature-control system 1 for carrying out the temperature-control method according to the invention comprises a temperature-control device 3, which is implemented to heat or cool a temperature-control fluid 2. This simpler temperature-control system 1 additionally comprises a temperature-control arrangement 5, which is implemented to conduct the temperature-control fluid 2 through a component 4 to be controlled in temperature (in the exemplary form of a meandering pipe laid in the component 4).

This simpler temperature-control system 1 additionally comprises a supply line 6, via which the temperature-control device 3 is connected to the temperature-control arrangement 5 to supply the temperature-control fluid 2, and a return line 7, via which the temperature-control arrangement 5 is connected to the temperature-control device 3 to return the temperature-control fluid 2. This simpler temperature-control system 1 additionally comprises a controller 8. This controller 8 comprises a valve 9 having an actuator 10, wherein this actuator 10 is implemented to set a degree of opening of the valve 9, which is inserted in the supply line 6 or in the return line 7 of the simpler temperature-control system 1.

In addition, the controller 8 comprises a supply temperature sensor 11 and a return temperature sensor 12. This controller 8 is implemented to activate the actuator 10. The supply temperature sensor 11 is implemented to register a supply temperature of the temperature-control fluid 2 and the return temperature sensor 12 is implemented to register a return temperature of the temperature-control fluid 2. The controller 8 of the simpler temperature-control system 1 according to the invention further comprises a regulator 13, which is implemented to register a temperature difference between the supply temperature and the return temperature of the temperature-control fluid 2. The regulator 13 is implemented such that, proceeding from this temperature difference, it causes the actuator 10 of the valve 9 to set the degree of opening of the valve 9 in such a manner that the mean temperature difference between the supply temperature and the return temperature of the temperature-control fluid 2 is in a predetermined value range.

When the method according to the invention is carried out, a supply temperature of the temperature-control fluid 2 is registered using the supply temperature sensor 11 and a return temperature of the temperature-control fluid 2 is registered using the return temperature sensor 12. A temperature difference between the supply temperature and the return temperature of the temperature-control fluid (2) is registered using a regulator 13, which the controller 8 comprises. Proceeding from this temperature difference, the regulator 13 causes the actuator 10 of the valve 9 to set the degree of opening of this valve 9 in such a manner that the mean temperature difference between the supply temperature and the return temperature of the temperature-control fluid 2 is in a predetermined value range.

The supply temperature of the temperature-control fluid 2 is preferably registered in the supply line 6 and the return temperature of the temperature-control fluid 2 is preferably registered in the return line 7. Both temperature sensors 11, 12 are particularly preferably located outside the component 4 (i.e., at the "beginning" or "end" of the temperature-control arrangement 5) and are therefore accessible at any time for maintenance work, for example. The temperature difference between the supply temperature and the return temperature can be constant (cf. FIG. 5) or variable, for example, oscillating (cf. FIG. 6) and can assume different values. Reference is therefore made to a mean temperature difference in order to correspond to these different operating states. The predetermined value range for this mean temperature difference preferably comprises less than 20° C. and is preferably 1 to 10° C. and particularly preferably 2 to 6° C.

As a refinement of the above-described temperature-control method, it is preferable for the regulator 13, as soon as it establishes that the measured supply temperature has reached a predetermined value, to cause the actuator 10 to close the valve 9. This rule is advisable in particular if, for example, when heating a living room floor 4, the regulator establishes that the supply temperature exceeds the return temperature by an excessively large value. Overheating of the living room floor can be prevented using this preferably temporary closing of the valve 9. Damage to the floor covering (for example, parquet flooring) is thus prevented, for example.

As an additional refinement of the above-described temperature-control method, it is preferable for a temperature difference between a current room temperature and a selected target temperature to be registered from temperature data, which were registered and provided using a thermostat 14 of the simpler temperature-control system 1, and that a shutoff valve 24, which is arranged in the supply line 6 or in the return line 7, to be opened or closed in accordance with a specific value of this temperature difference. This rule is advisable in particular if a two-point regulation is to be used, in order to set a maximum temperature difference of 2° C., for example, between the target temperature and the actual temperature (room temperature).

As a further refinement of the above-described temperature-control method, it is preferable for an actual temperature of a room in proximity to the component 4 to be additionally registered using the regulator 13 of the controller 8 and using a room thermometer, wherein the regulator 13, as soon as it establishes that the measured supply temperature has deviated from the actual temperature by a predetermined value range, causes the actuator 10 to close the valve 9. This rule is advisable in particular if, for example, the room temperature rises unexpectedly when heating a living room floor (for example, due to sunshine or the operation of an open fire). This value range can be adapted to the conditions and is, for example, 10° C., 5° C., or 2° C. This preferably temporary closing of the valve 9 can prevent heat from being unintentionally withdrawn from the living room floor by an excessively low supply temperature. In the case of heating, these value ranges are typically below the actual temperature; in the case of cooling, these value ranges are typically above the actual temperature.

FIG. 1 shows a schematic top view of a simpler temperature-control system 1 according to a first embodiment, in which the sensors for the supply temperature 11 and the return temperature 12 are arranged near the valve 9, which is inserted into the return line 7 here. The actuator 10 having the regulator 13 is arranged directly at the valve 9. The regulator 13 is electrically connected to the supply temperature sensor 11 and to the return temperature sensor 12, which is illustrated here by dotted lines. The shutoff valve 24 is inserted into the supply line 6 here. Therefore, the entire controller 8 is located outside the component 4 and also outside the temperature-control device 3.

Figure 2:
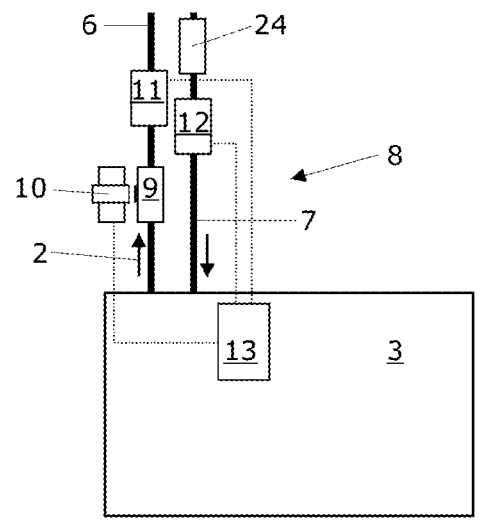

Comparably thereto, FIG. 2 shows a schematic partial top view of the controller of a simpler temperature-control system according to a second embodiment, in which the sensors for the supply temperature 11 and the return temperature 12 are arranged near the valve 9, which is inserted into the supply line 6 here. The actuator 10 is again arranged directly at the valve 9. The regulator 13 is located at a practically arbitrary distance from the above-mentioned components of the controller 8 and is located near the temperature-control device 3 or is even integrated in the latter. The regulator 13 is electrically connected to the supply temperature sensor 11 and to the return temperature sensor 12 and also to the actuator 10, which is illustrated here by dotted lines. The shutoff valve 24 is inserted into the return line 7 here. The controller 8 is therefore distributed onto a region outside the component 4 and a region at or inside the temperature-control device 3.

Figure 3:
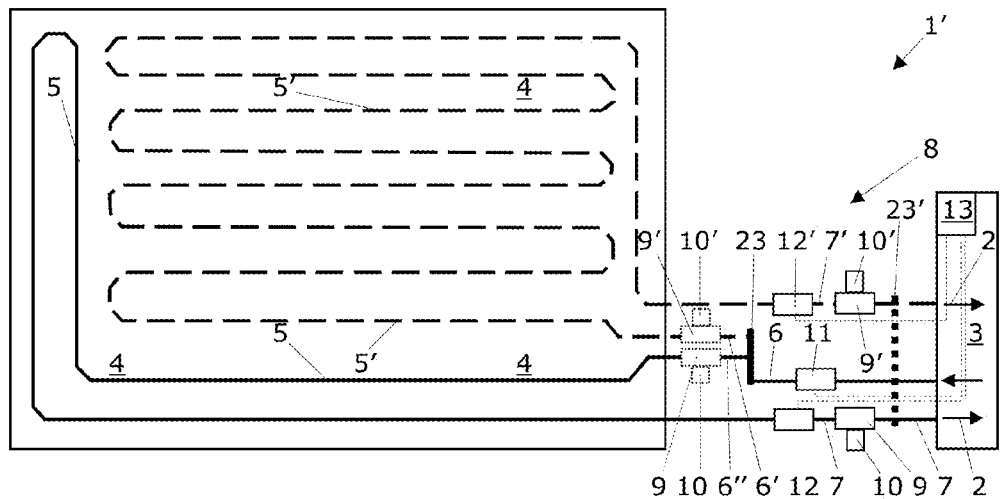

FIG. 3 shows a schematic top view of a more complex temperature-control system 1' for carrying out the method according to the invention for temperature control of components 4, wherein different embodiment variants are shown. This more complex temperature-control system 1' comprises two temperature-control arrangements 5,5' (each in the exemplary form of pipes laid in loops or meandering in the component 4) for conducting the temperature-control fluid 2 through the component 4 to be controlled in temperature. The two temperature-control arrangements 5,5' are connected to the temperature-control device 3 via a common supply line 6.

This more complex temperature-control system 1' additionally comprises two return lines 7,7' for returning the temperature-control fluid 2 from the two temperature-control arrangements 5,5' to the temperature-control device 3.

This more complex temperature-control system 1' further comprises two return temperature sensors 12,12', wherein each return temperature sensor 12,12' is arranged on or in one of the return lines 7,7' and the supply temperature sensor 11 is arranged on or in the common supply line 6.

This more complex temperature-control system 1' additionally comprises two valves 9,9', which are each equipped with an actuator 10,10' and are each inserted in a separate supply line 6,6" after a supply manifold 23 or in one of the return lines 7,7', preferably before an optional return manifold 23'. The actuators 10,10' are implemented to set a degree of opening of the respective valve 9,9' and the controller 8 is implemented to activate the actuators 10,10'.

This more complex temperature-control system 1' can, as shown, have two temperature-control arrangements 5,5', however, there may also be more than two (i.e., n) temperature-control arrangements. The number of return lines 7,7', return temperature sensors 12,12', valves 9,9', and actuators 10,10' consequently also rises in accordance with the number of the temperature-control arrangements, so that a number of 2 to n of all of these components can be expected in a more complex temperature-control system 1'. However, it is preferable in any case for the 2 to n temperature-control arrangements 5,5' to be connected via a common supply line 6 to the temperature-control device 3.

If, as shown, it only has two temperature-control arrangements 5,5', this more complex temperature-control system 1' can comprise a supply manifold 23 or, alternatively thereto, a simple T-part for connecting the common supply line 6 to the separate supply lines 6,6". If a more complex temperature-control system 1' comprises more than two separate supply lines 6',6", a person skilled in the art will thus typically always provide a supply manifold 23. If it only has two temperature-control arrangements 5,5', as shown, this more complex temperature-control system 1' can have two separate return lines 7,7'; these two return lines 7, 7' can, alternatively thereto, be connected via a return manifold 23' or, alternatively thereto, via a simple T-part and then a common return line to the temperature-control device 3. If a more complex temperature-control system 1' has more than two temperature-control arrangements 5,5', a person skilled in the art will thus typically always provide a return manifold 23'.

According to the selected component configuration, the 2 to n valves 9,9', which are each equipped with an actuator 10,10', can each be inserted into a separate supply line 6',6" (shown by dotted lines in FIG. 3 and viewed in the flow direction) after a supply manifold 23 (shown emphasized by bold lines) or alternatively thereto each in one of the return lines 7,7'. The insertion of each of the 2 to n valves 9,9' in one of the return lines 7,7' is preferably performed (viewed in the flow direction) before a return manifold 23' (shown by bold dotted lines), if such a return manifold 23' is provided.

In FIG. 3, the sensors for the supply temperature 11 or for the return temperature 12,12' are arranged near the supply manifold 23 or near the return manifold 23', respectively. The valves 9,9' are arranged with the actuators 10,10' associated therewith near the return temperature sensors 12,12' and before the return manifold 23' or, alternatively thereto, after the supply manifold 23. The temperature sensors 11,12,12' are particularly preferably located outside the component 4 (i.e., at the "beginning" or "end" of the temperature arrangements 5, 5') and are therefore accessible at any time for maintenance work, for example.

For the sake of simplicity, the electrical connections between the actuators 10,10' and the regulator 13 arranged in the temperature-control device 3 are not shown here. The regulator 13 is also electrically connected to the supply temperature sensor 11 and to the return temperature sensors 12,12', which is illustrated here by dotted lines. The shutoff valve 24 is typically inserted into the return line 7. The controller 8 is therefore distributed onto the region outside the component 4 and a region at or inside the temperature-control device 3. In this example, a shutoff valve 24 was omitted.

The method according to the invention is carried out using such a more complex temperature-control system 1', in that the regulator 13 registers the respective temperature differences between the common supply temperature, which is registered by the supply temperature sensor 11, and the two (in general 2 to n) individual return temperatures of the temperature-control fluid 2, which are registered by the return temperature sensors 12,12'. An individual temperature difference between the supply temperature and each one of the two (in general 2 to n) return temperatures of the temperature-control fluid 2 is registered in each case using the regulator 13 of the controller 8. Proceeding from these individual temperature differences, the regulator 13 causes the actuators 10,10' of the two (in general 2 to n) valves 9,9' to set the degree of opening of these valves 9,9' in such a manner that the individual mean temperature differences between the supply temperature and the respective return temperature of the temperature-control fluid 2 are each in a predetermined value range.

When carrying out this temperature-control method, it can be provided that the value ranges, which are regulated by the regulator 13, of the temperature differences and flow rates in the two (in general 2 to n) temperature-control arrangements 5,5' are different.

When carrying out this temperature-control method, it can also be provided that the predetermined value ranges of the temperature differences, which are regulated by the regulator 13, are 1° C. to 10° C., preferably 2° C. to 6° C. In addition, it can be provided that flow rates, which are regulated by the regulator 13, in the temperature-control arrangements 5,5' are 0.2 l/min to 10 l/min.

In one exemplary embodiment of a temperature-control method according to the invention (cf. FIG. 7), a living room floor having a total surface area of 40 m² was equipped with two heating circuits, i.e., with two temperature-control arrangements 5,5' of such a more complex temperature-control system 1'. The first temperature-control arrangement 5 supplied a first partial area of 20 m² and the second temperature-control arrangement 5' supplied a second partial area of 20 m² of the living room floor. Both temperature-control arrangements 5,5' were connected via a common supply line 6 to a temperature-control device 3, which is implemented for heating, wherein this common supply line 6 comprised a supply temperature sensor 11, which was operationally linked to a regulator 13 and a controller 8. Each of the temperature-control arrangements 5, 5' had an individual return line 7,7', each of which comprised a return temperature sensor 12,12', which was operationally linked to the regulator 13, to the controller 8, and to one actuator 10,10' of the valves 9,9' in each case.

In this example, a shutoff valve 24 was omitted. A room temperature sensor was used for measuring the room temperature, wherein this measurement result only displayed the effect of the temperature-control method, but did not influence the temperature-control method itself. An amount of 6° C. was set in the controller 8 as the temperature difference between the supply temperature and the return temperature of the temperature-control fluid 2, whereby the regulator 13, proceeding from this temperature difference, caused the actuators 10,10' of the valves 9,9' of both heating circuits to set the degree of opening of the valves 9,9' such that the mean temperature difference between the supply temperature and the return temperature of the temperature-control fluid 2 was in this predetermined value range. The flow rate of the temperature-control fluid 2 in the case of open valves 9,9' was approximately 2.5 l/min.

Figure 7:
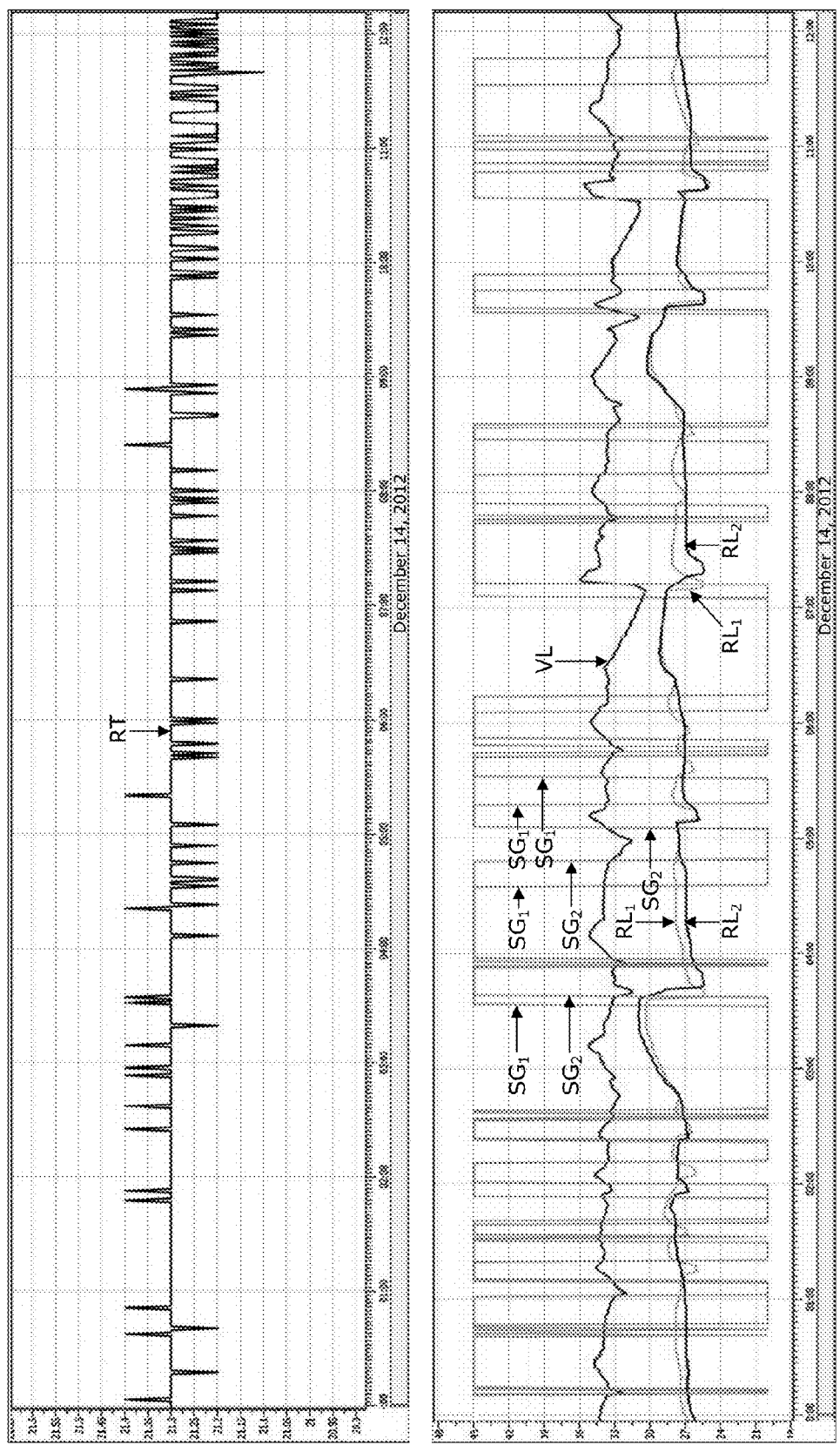
FIG. 7 shows the result of a temperature-control method carried out on a living room floor having two heating circuits.

The result of this temperature-control method, which was carried out on a living room floor having two heating circuits, is shown in FIG. 7:

The upper graph shows the current ACTUAL temperature (RT) of the living room. The time in hours (00:00 to 12:00) was plotted on the abscissa and the room temperature in tenths of degrees and fiftieths of degrees Celsius was plotted on the ordinate. It can be stated that this living room temperature could be kept very consistently at 21.3° C. over a time of 12 hours (midnight to noon), wherein this temperature only deviated by +/−0.1° C. from this mean value. The measured outside temperature was −6° C. at midnight (00:00) and +2° C. on the following noon (12:00).

The lower graph shows the supply temperature (VL), which moved in a range from approximately 30 to 36° C. The time in hours (00:00 to 12:00) is plotted on the abscissa and the temperature in steps of 3° C. is plotted on the ordinate. The two return temperatures ($RL_1,RL_2$) moved in accordance with the selected temperature difference in a range from 24 to 30° C. The lower graph also shows the actuator signals ($SG_1,SG_2$) for the two valves 9,9'; wherein the different points in time of the change of the signals (1/0 or 0/1, respectively) confirm that each of the two heating circuits or each of the two temperature-control arrangement 5,5' were controlled autonomously, i.e., independently of the other heating circuit.

This example shows that the temperature of a living room can be very exactly regulated using this relatively simple temperature-control method in spite of different outside temperatures.

FIG. 4 shows a selection of exemplary actuator/regulator combinations. FIG. 4A shows a bimetallic actuator 10 implemented as a regulator 13. This bimetallic actuator/regulator 15 is arranged between the supply line 6 and the return line 7 such that one of the components of the bimetal touches each of the two lines. The contact of the bimetallic actuator/regulator 15 with the supply line 6 and with the return line 7 is so intensive that each material component of the bimetallic actuator/regulator 15 either assumes the supply temperature or the return temperature. This bimetallic actuator/regulator 15 comprises a lever formed from the two components of the bimetal, which presses a part of the spring-loaded guided valve body of the valve 9, which protrudes by approximately a stroke 16. If the supply temperature is higher than the return temperature, this lever bends in the direction of the valve 9 and moves the spring-loaded guided valve body of the valve 9 by an amount which just corresponds to the temperature difference. This movement of the valve body 9 moves the valve 9 into an increased open position, so that more temperature-control fluid 2 can circulate through the temperature-control arrangement 5. The closer the return temperature comes to the supply temperature, the more the bimetallic lever straightens out and allows the valve body to assume a less open position in the valve 9. Through suitable placement and accordingly adapted geometry of the lever, the mean value range of the temperature difference between supply and return temperatures can be set such that it is 1° C. to 10° C. and preferably 2° C. to 6° C., and flow rates, which are regulated by this deenergized bimetallic actuator/regulator 15, in the temperature-control arrangements 5, 5' are 0.2 l/min to 10 l/min.

Figure 4A:
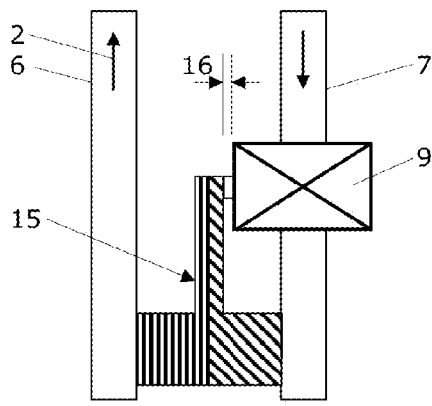
FIG. 4A shows a bimetallic actuator implemented as a regulator.
Figure 4B:
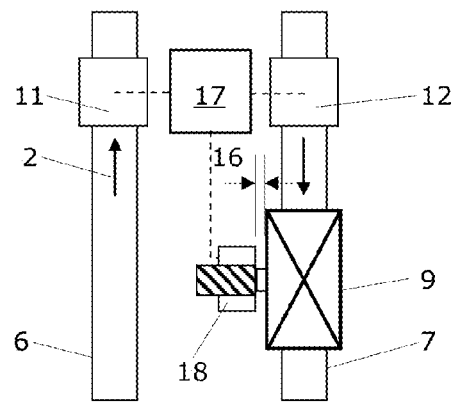
FIG. 4B shows an expansion actuator in combination with a Schmitt trigger.

FIG. 4B shows an expansion actuator in combination with a regulator, which is implemented as a Schmitt trigger. The Schmitt trigger 17 is electrically connected on the input side to the supply temperature sensor 11 and also to the return temperature sensor 12 and is electrically connected on the output side to the expansion actuator 18. The expansion actuator 18 comprises an electrical heater and an actuator cartridge, which is closed per se, having temperature-dependent volume. If the supply temperature is higher than the return temperature, the Schmitt trigger 17 establishes this temperature difference and causes the electrical heater in the expansion actuator 18 to heat up the actuator cartridge such that it expands by a corresponding amount (at most by the stroke 16). The spring-loaded guided valve body of the valve 9 is thus moved by an amount which just corresponds to the temperature difference. This movement of the valve body moves the valve 9 into an increased open position, so that more temperature-control fluid 2 can circulate through the temperature-control arrangement 5. The closer the return temperature comes to the supply temperature, the less the heating power caused by the Schmitt trigger 17, and the expansion actuator 18 allows the valve body to assume a less open position in the valve 9. Through a suitable design of the Schmitt trigger 17 and the expansion actuator 18, the mean value range of the temperature difference between supply and return temperatures can be set such that it is 1° C. to 10° C. and preferably 2° C. to 6° C., and the flow rates in the temperature-control arrangements 5, 5' are 0.2 l/min to 10 l/min.

Figure 4C:
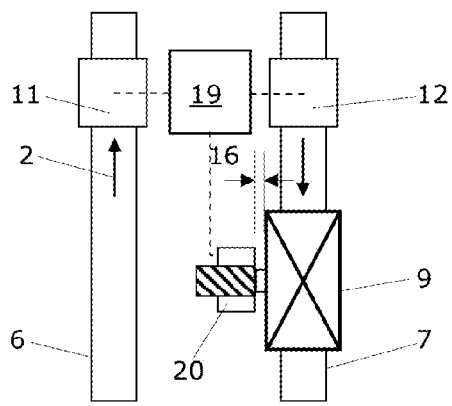
FIG. 4C shows an actuator implemented as an electric motor in combination with a differential amplifier.

FIG. 4C shows an actuator implemented as an electric motor in combination with a differential amplifier. The differential amplifier 19 is electrically connected on the input side to the supply temperature sensor 11 and also to the return temperature sensor 12 and is electrically connected on the output side to the electric motor 20 of the actuator, which also comprises a spindle. If the supply temperature is higher than the return temperature, the differential amplifier 19 establishes this temperature difference and causes the electric motor 20 in the actuator to drive the spindle such that it moves by a corresponding amount (at most by the stroke 16) toward the valve 9. The spring-loaded guided valve body of the valve 9 is thus moved by an amount which just corresponds to the temperature difference. This movement of the valve body brings the valve 9 into an increased open position, so that more temperature-control fluid 2 can circulate through the temperature-control arrangement 5. The closer the return temperature comes to the supply temperature, the smaller the advance of the spindle, which is driven by an electric motor, caused by the differential amplifier 19, and the electric motor actuator 20 allows the valve body to assume a less open position in the valve 9. Through a suitable design of the differential amplifier 19 and the spindle, which is driven by an electric motor, the mean value range of the temperature interval between supply and return temperatures can be set such that it is 1° C. to 10° C. and preferably 2° C. to 6° C., and the flow rates in the temperature-control arrangements 5, 5' are 0.2 l/min to 10 l/min.

Figure 4D:
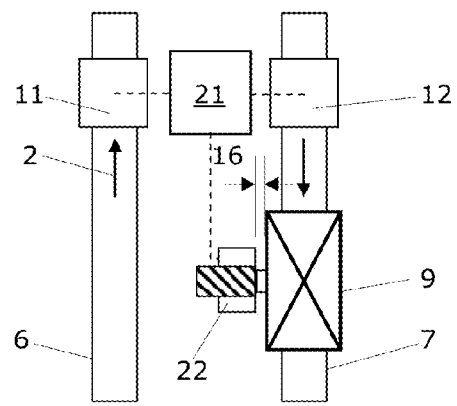
FIG. 4D shows a solenoid actuator in combination with a microprocessor.

FIG. 4D shows a solenoid actuator in combination with a microprocessor. The microprocessor 21 is electrically connected on the input side to the supply temperature sensor 11 and also to the return temperature sensor 12 and is electrically connected on the output side to the coil of a solenoid actuator 22, which also comprises a core. If the supply temperature is higher than the return temperature, the microprocessor 21 establishes this temperature difference and causes the coil of the solenoid actuator 22 to drive the core such that it moves by a corresponding amount (at most by the stroke 16) toward the valve 9. The spring-loaded guided valve body of the valve 9 is thus moved by an amount which just corresponds to the temperature difference. This movement of the valve body moves the valve 9 into an increased open position, so that more temperature-control fluid 2 can circulate through the temperature-control arrangement 5. The closer the return temperature comes to the supply temperature, the less the advance of the electromagnetically driven core caused by the microprocessor 21, and the solenoid actuator 22 allows the valve body to assume a less open position in the valve 9. Through a suitable design of the microprocessor 21 and the electromagnetically driven core, the mean value range of the temperature interval between supply and return temperatures can be set such that it is 1° C. to 10° C. and preferably 2° C. to 6° C., and the flow rates in the temperature-control arrangements 5, 5' are 0.2 l/min to 10 l/min.

Figure 5A:
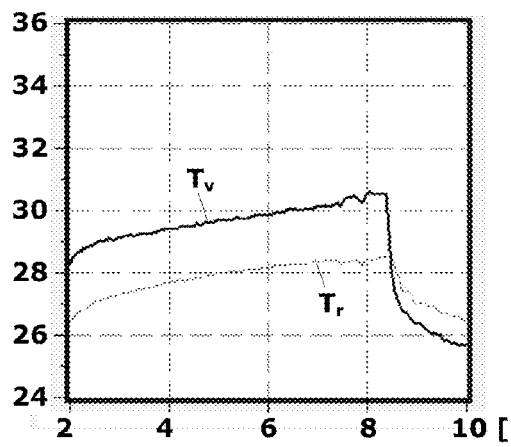
FIG. 5A shows the temperature curve in the case of a constant flow of the temperature-control fluid of 2.5 l/min and with a temperature difference resulting therefrom between supply temperature and return temperature of approximately 2.0° C.
Figure 5B:
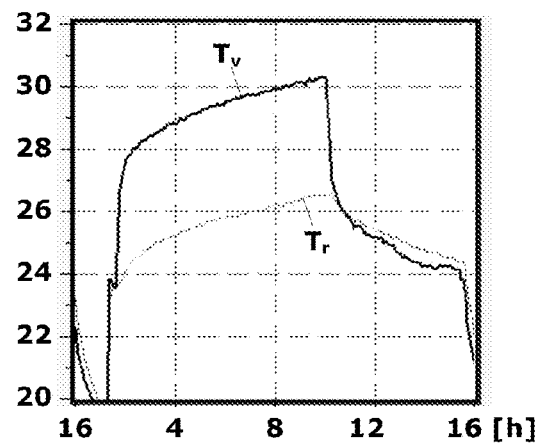
FIG. 5B shows the temperature curve in the case of a constant flow of the temperature-control fluid of 0.5 l/min and with a temperature difference resulting therefrom between supply temperature and return temperature of approximately 4.0° C.

FIG. 5A shows, in a temperature/time graph, the temperature curve of the supply temperature $T_v$ and the return temperature $T_r$ in the case of a constant flow rate of the temperature-control fluid of 2.5 l/min and a constant temperature difference resulting therefrom between supply temperature and return temperature of approximately 2.0° C. FIG. 5B shows, in a temperature/time graph, the temperature curve of the supply temperature $T_v$ and the return temperature $T_r$ in the case of a constant flow rate of the temperature-control fluid of 0.5 l/min and a constant temperature difference resulting therefrom between supply temperature and return temperature of approximately 4.0° C.

It is therefore obvious from FIGS. 5A and 5B that the temperature difference between the supply and the return is substantially also determined by the flow rate of the temperature-control fluid 2. A further contributory parameter is in particular the level of the supply temperature.

Figure 6:
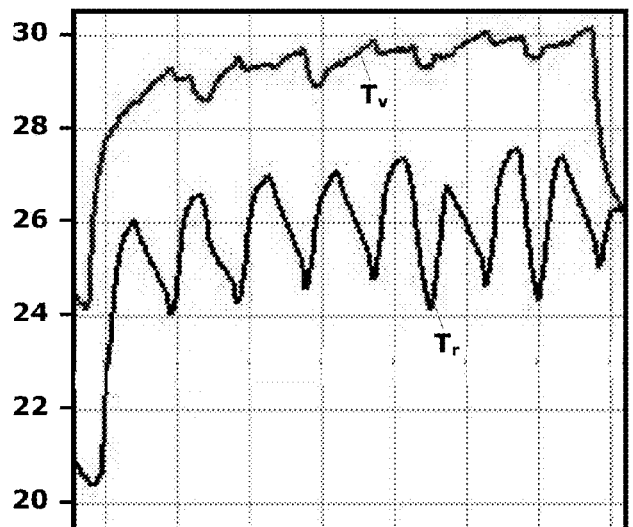
FIG. 6 shows the temperature curve using a regulation, during which the valve was opened and closed again in pulses.
Figure 6:
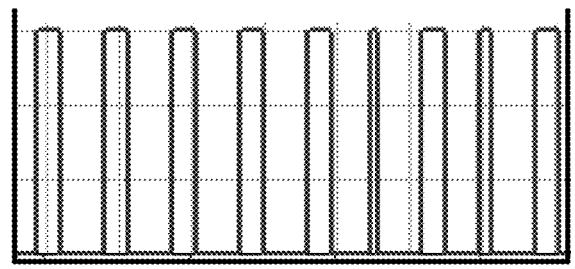

FIG. 6 shows, in a temperature/time graph, the temperature curve of the supply temperature $T_v$ and the return temperature $T_r$ with a regulation 8, during which the valve 9 was opened and closed again in pulses. In addition, FIG. 6 shows the respective position of the valve 9 in a pulse graph, which corresponds to the time axis and is arranged underneath it. A possible regulating behavior is shown here, in the case of which the mean spread of the supply temperature $T_v$ or the return temperature $T_r$, respectively, is directly set dynamically using the actuator 10 and using the valve 9 associated with this actuator 10. The upper curve shows the supply temperature $T_v$, the lower curve shows the return temperature $T_r$, and the pulse curve shows the actuator signal, wherein A stands for 100% and Z stands for 0%. According to the invention, the regulator 13 sets this value independently of the pressure of the temperature-control fluid 2, independently of the flow rate of the temperature-control fluid 2, independently of the supply temperature, and independently of the temperature of the temperature-control device 3. The maximum total temperature difference between the supply temperature and the return temperature is approximately 6° C., the maximum current temperature difference between the supply temperature and the return temperature is approximately 5° C., and the mean resulting temperature difference between the supply temperature and the return temperature is approximately 4° C.

In the context of the present invention, the temperature-control fluid 2 is understood as any liquid, any gas, and any gas-liquid mixture which can be used for heating (supplying energy) and/or for cooling (dissipating energy) and therefore also for transporting energy or heat. In floor heaters, for example, a water-antifreeze mixture can be used, and in cooling circuits a liquid having a high vaporization heat capacity is often used. For example, a pellet, gas, or oil burner having a heating boiler or a cooling assembly having a coolant container come into consideration as the temperature-control devices 3.

In the context of the present invention, one floor or multiple floors, one or more walls, and/or one ceiling or multiple ceilings of living or working spaces can be considered as the component 4 to be controlled in temperature. These components can also be present in storage spaces or in exhibition spaces, for example. However, these components can also be implemented as freestanding, suspended, or horizontal heating or cooling walls.

Lines for conducting temperature-control fluids, such as pipes and the like, are considered to be the exemplary fluidic connection in the temperature-control systems 1,1' here.

Electrical cables for conducting electrical signals, but also wireless connections for transmitting electronic data or signals, are considered to be the exemplary electrical connections in the temperature-control systems 1,1' here.

The valves 9,9' are preferably implemented as flow rate regulating valves and preferably always have a minimal degree of opening in the open state, which causes a minimum flow rate of the temperature-control fluid 2 of 0.1 to 2 l/min. In addition, the actuators 10,10' preferably comprise spring-loaded plungers. Actuators 10,10' which each comprise an electrical heater and an actuator cartridge having temperature-dependent volume, which is closed per se, are especially preferred.

Identical reference signs refer to corresponding device features.

LIST OF REFERENCE SIGNS 1,1' temperature-control system
2 temperature-control fluid
3 temperature-control device
4 component
5,5' temperature-control arrangement
6 supply line, common supply line
6',6" separate supply lines
7,7' return line
8 controller
9,9' valve
10,10' actuator
11 supply temperature sensor
12,12' return temperature sensor
13 regulator
14 thermostat
15 bimetallic actuator/regulator
16 stroke
17 Schmitt trigger
18 expansion actuator
19 differential amplifier
20 electric motor, electric motor actuator
21 microprocessor
22 solenoid actuator
23 supply manifold
23' return manifold
24 shutoff valve

What is claimed is:

1. A method for controlling the temperature of a component (4) using a temperature-control system;
   wherein the temperature-control system (1') comprises:
   a temperature-control device (3), which is implemented for heating or cooling a temperature-control fluid (2);
   2 to n temperature-control arrangements (5,5') for conducting the temperature-control fluid (2) through the component (4) to be controlled in temperature, wherein the 2 to n temperature-control arrangements (5,5') are connected via a common supply line (6) to the temperature-control device (3) to supply the temperature-control fluid (2);
   2 to n return lines (7,7') for returning the temperature-control fluid (2) from the 2 to n temperature-control arrangements (5,5') to the temperature-control device (3);
   2 to n return temperature sensors (12,12'), wherein each return temperature sensor (12,12') is arranged on or in one of the return lines (7,7') and a supply temperature sensor (11) is arranged on or in the common supply line (6);
   2 to n valves (9,9'), which are each equipped with an actuator (10,10') and which are each inserted in a separate supply line (6',6") after a supply manifold (23) or are each inserted in one of the return lines (7,7') before an optional return manifold (23'), wherein the actuators (10,10') are implemented to set a degree of opening of the respective valve (9,9'), and wherein a control module (8) is implemented to activate the actuators (10,10');
   wherein a regulator (13) of the control module (8) registers the respective temperature differences between the common supply temperature registered by the supply temperature sensor (11) and the 2 to n individual return temperatures of the temperature-control fluid (2) registered by the return temperature sensors (12, 12'),
   wherein, using the regulator (13) of the control module (8), an individual temperature difference between the supply temperature and each one of the 2 to n return temperatures of the temperature-control fluid (2) is registered in each case, and
   wherein the regulator (13), proceeding from these individual temperature differences, causes the actuators (10, 10') of the 2 to n valves (9,9') to set the degree of opening of these valves (9,9') in such a manner that the individual mean temperature differences between the supply temperature and the respective return temperature of the temperature-control fluid (2) are each in a predetermined value range.

2. The temperature-control method according to claim 1, wherein the value ranges of the temperature differences and flow rates, which are regulated by the regulator (13), in the 2 to n temperature-control arrangements (5,5') are different.

3. The temperature-control method according to claim 1, wherein the predetermined value ranges of the temperature differences, which are regulated by the regulator (13), are 1° C. to 10° C. or 2° C. to 6° C., and the flow rates, which are regulated by the regulator (13), in the temperature arrangements (5, 5') are 0.2 l/min to 10 l/min.

4. A temperature-control system (1') for carrying out the temperature-control method according to claim 1,
   wherein the temperature-control system comprises:
   a temperature-control device (3), which is implemented for heating or coiling a temperature-control fluid (2);
   2 to n temperature-control arrangements (5,5') for conducting the temperature-control fluid (2) through the component (4) to be controlled in temperature, wherein the 2 to n temperature-control arrangements (5,5') are connected via a common supply line (6) to the temperature-control device (3) to supply the temperature-control fluid (2);
   2 to n return lines (7,7') for returning the temperature-control fluid (2) from the 2 to n temperature-control arrangements (5,5') to the temperature-control device (3);
   2 to n return temperature sensors (12,12'), wherein each return temperature sensor (12,12') is arranged on or in one of the return lines (7,7') and a supply temperature sensor (11) is arranged on or in the common supply line (6);
   2 to n valves (9,9'), which are each equipped with an actuator (10,10') and which are each inserted in a separate supply line (6',6") after a supply manifold (23) or are each inserted in one of the return lines (7,7') before an optional return manifold (23'), wherein the actuators (10,10') are implemented to set a degree of opening of the respective valve (9,9'), and wherein a control module (8) is implemented to activate the actuators (10,10').

\* \* \* \* \*